(12) United States Patent
Issa et al.

(10) Patent No.: US 7,596,549 B1
(45) Date of Patent: Sep. 29, 2009

(54) METHODS, SYSTEMS, AND PRODUCTS FOR ANALYZING ANNOTATIONS FOR RELATED CONTENT

(75) Inventors: Alfredo C. Issa, Apex, NC (US); Richard J. Walsh, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 177 days.

(21) Appl. No.: 11/396,746

(22) Filed: Apr. 3, 2006

(51) Int. Cl.
*G06F 17/30* (2006.01)
(52) U.S. Cl. ......................... 707/3; 707/104.1
(58) Field of Classification Search ........................ None
See application file for complete search history.

(56) References Cited

U.S. PATENT DOCUMENTS

| | | |
|---|---|---|
| 5,309,359 A | 5/1994 | Katz et al. |
| 5,404,295 A | 4/1995 | Katz et al. |
| 5,600,775 A | 2/1997 | King et al. |
| 5,625,833 A | 4/1997 | Levine et al. |
| 6,006,241 A | 12/1999 | Purnaveja et al. |
| 6,173,287 B1 | 1/2001 | Eberman et al. |
| 6,173,317 B1 | 1/2001 | Chaddha et al. |
| 6,247,002 B1 | 6/2001 | Steels |
| 6,311,194 B1 | 10/2001 | Sheth et al. |
| 6,332,144 B1 | 12/2001 | deVries et al. |
| 6,389,409 B1 | 5/2002 | Horovitz et al. |
| 6,463,433 B1 | 10/2002 | Baclawski |
| 6,498,795 B1 | 12/2002 | Zhang et al. |
| 6,546,405 B2 | 4/2003 | Gupta et al. |
| 6,553,367 B2 | 4/2003 | Horovitz et al. |
| 6,564,263 B1 | 5/2003 | Bergman et al. |
| 6,629,100 B2 | 9/2003 | Morris et al. |
| 6,675,159 B1 | 1/2004 | Lin et al. |
| 6,744,922 B1 | 6/2004 | Walker |
| 6,772,160 B2 | 8/2004 | Cho et al. |
| 6,917,944 B1 | 7/2005 | Prasad et al. |
| 6,970,840 B1 | 11/2005 | Yu et al. |
| 2002/0059290 A1 | 5/2002 | Rising, III |
| 2003/0120662 A1 | 6/2003 | Vishik |
| 2003/0163597 A1 | 8/2003 | Hellman et al. |
| 2003/0179228 A1 | 9/2003 | Schreiber et al. |
| 2003/0191776 A1 | 10/2003 | Obrador |
| 2003/0204605 A1 | 10/2003 | Hudson et al. |
| 2003/0226142 A1 | 12/2003 | Rand |
| 2004/0010483 A1 | 1/2004 | Brands et al. |
| 2004/0024720 A1 | 2/2004 | Fairweather |
| 2004/0054672 A1 | 3/2004 | Tsuchitani et al. |
| 2004/0098754 A1 | 5/2004 | Vella et al. |

(Continued)

OTHER PUBLICATIONS

Belle L. Tseng et al., "Using MPEG-7 and MPEG-21 for Personalizing Video," IEEE Multimedia, Jan.-Mar. 2004, pp. 45-52.

(Continued)

*Primary Examiner*—John E Breene
*Assistant Examiner*—Thu-Nguyet Le
(74) *Attorney, Agent, or Firm*—Withrow & Terranova, PLLC

(57) ABSTRACT

Methods, systems, and products are disclosed for analyzing annotations for related content. A set of annotations, occurring within a window of time in a segment of content, is received. A query is sent for related content having a membership subset of the set of annotations. A recommendation is sent for the related content.

5 Claims, 11 Drawing Sheets

U.S. PATENT DOCUMENTS

| | | |
|---|---|---|
| 2004/0170321 A1 | 9/2004 | Gong et al. |
| 2004/0220893 A1 | 11/2004 | Spivack et al. |
| 2005/0034107 A1 | 2/2005 | Kendall et al. |
| 2005/0086069 A1 | 4/2005 | Watson et al. |
| 2005/0091279 A1 | 4/2005 | Rising, III |
| 2005/0149510 A1 | 7/2005 | Shafrir |
| 2005/0154701 A1 | 7/2005 | Parunak et al. |
| 2005/0216443 A1* | 9/2005 | Morton et al. ............ 707/3 |
| 2005/0234958 A1 | 10/2005 | Sipusic et al. |

OTHER PUBLICATIONS

Xingquan Zhu et al., "Hierarchical video content description and summarization using unified semantic and visual similarity," Multimedia Systems 9(1), Jul. 2003, pp. 31-53.

Wallapak Tavanapong, "Shot Clustering Techniques for Story Browsing," IEEE Transactions on Multimedia, vol. 6, No. 4, Aug. 2004, pp. 517-527.

Welcome to Webbed Footnotes!, http://web.media.mit.edu/~golder/projects/webbedfootnotes/.

Scott Carter et al., "Digital Graffiti: Public Annotation of Multimedia Content," Apr. 24-29, 2004.

Ronald Schroeter et al., "FilmEd—Collaborative Video Indexing, Annotation and Discussion Tools Over Broadband Networks."

Deborah L. McGuinness et al., editors; "OWL Web Ontology Language—Overview", copyright 2004 World Wide Web Consortium (W3C), published Feb. 10, 2004, http://www.w3.org/TR/2004/REC-owl-features-20040210/, 19 pages.

* cited by examiner

FIG. 3
Annotation Classifications
A = Kirk     E = TJ Hooker
B = Nemoy     F = Priceline
C = Spock     X = Other
D = Shatner
Content #1: WRATH OF KHAN
Content #2: TJ HOOKER

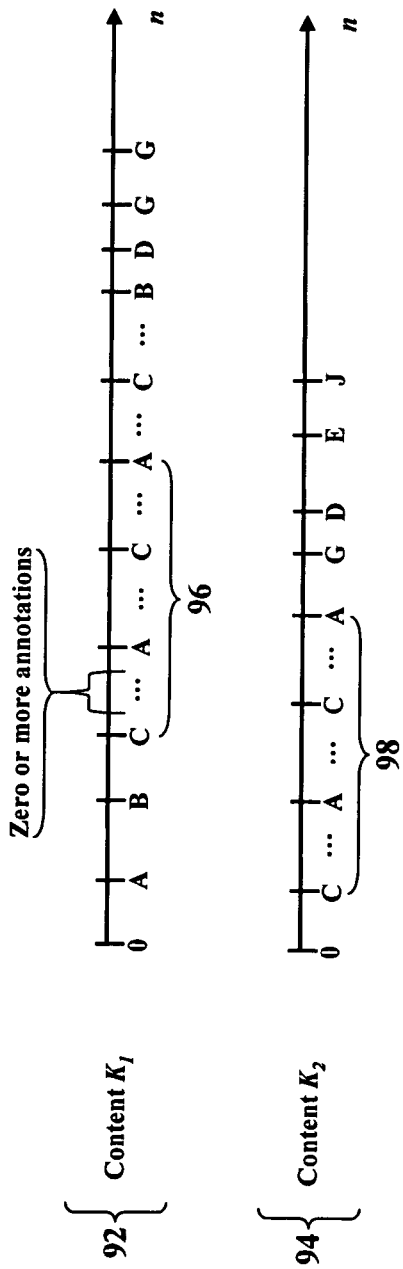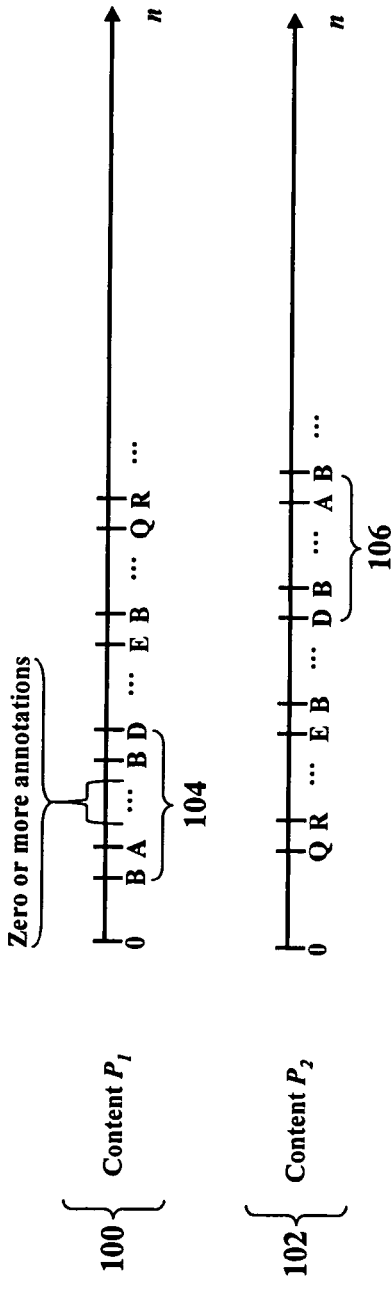

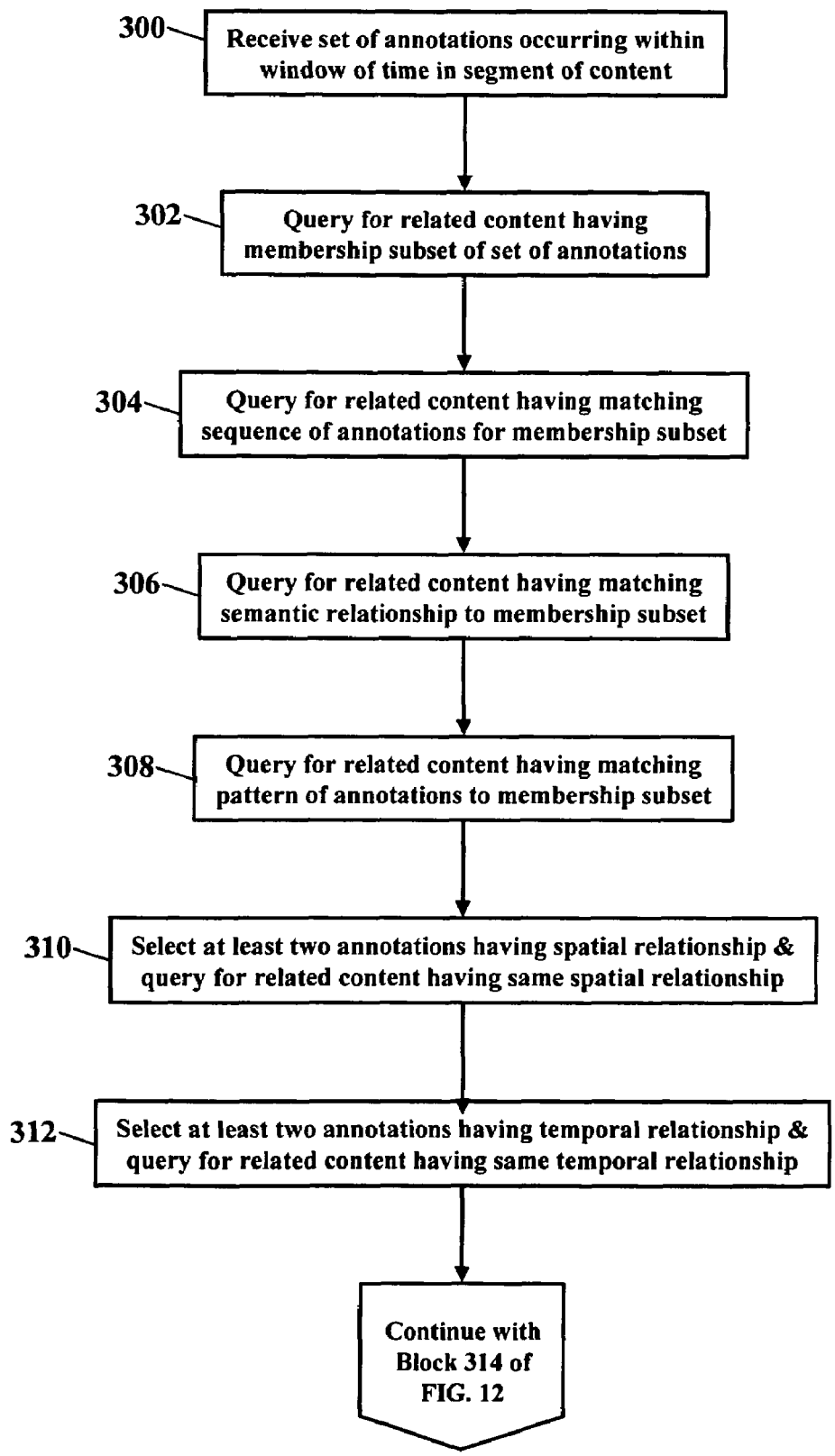

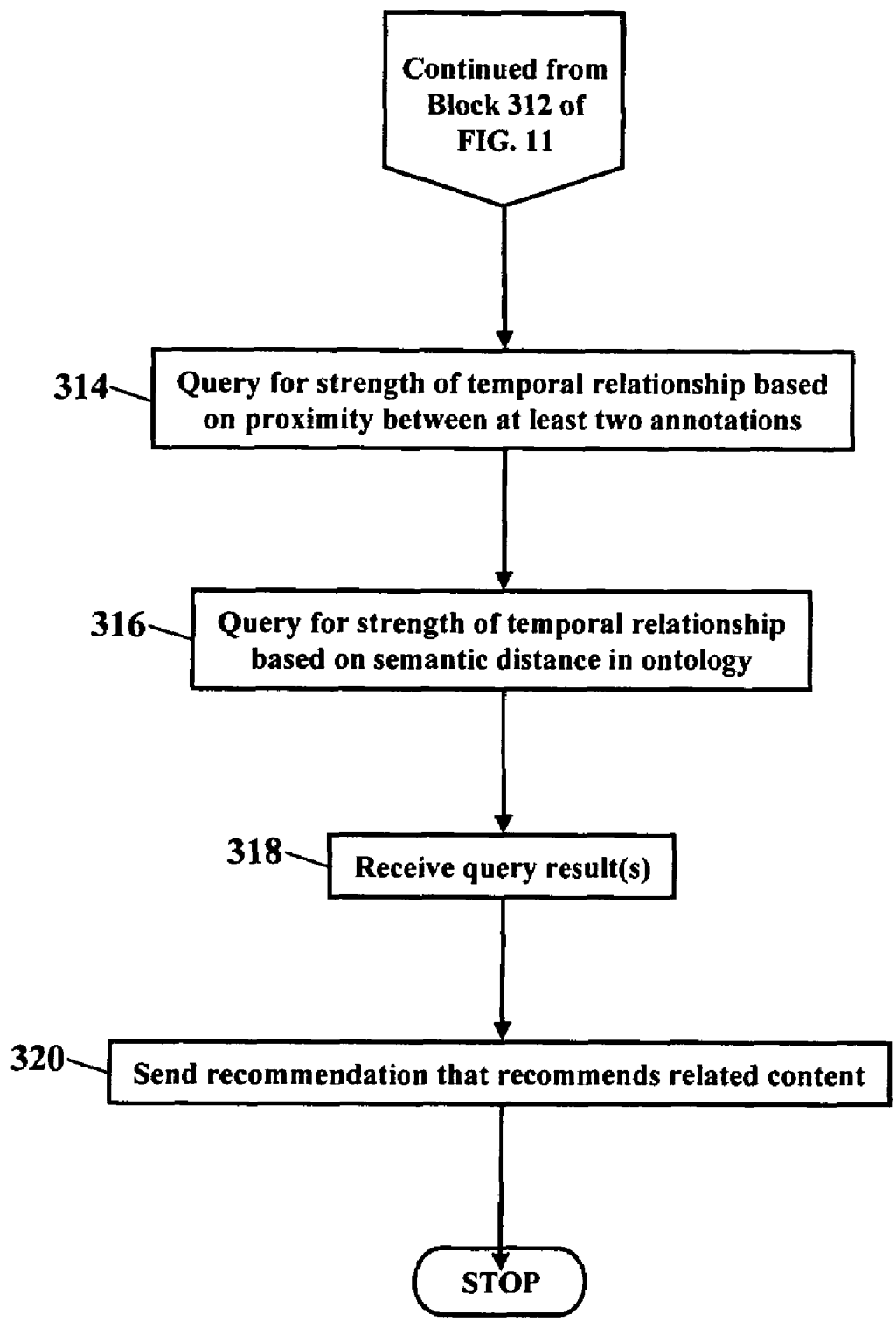

METHODS, SYSTEMS, AND PRODUCTS FOR ANALYZING ANNOTATIONS FOR RELATED CONTENT

BACKGROUND

This application particularly relates to finding related content using relationships between annotations.

Semantic understanding of annotations is needed. Many types of content include annotations. Video content, for example, is now being offered with annotations that allow a user to further explore information related to the video. These annotations may identify events, characters, or other sequences in the video stream that may be interesting to the viewer. Even the Motion Pictures Expert Group (M.P.E.G.) has proposed a standard for describing multimedia content data that supports interpretation of annotations (or "descriptors"). Despite these known annotations, conventional efforts do not analyze the annotations over time. As the content changes over time, the annotations, too, change over time. The conventional methods and systems fail to explore and understand semantic relationships between time-varying annotations. What is needed, then, are methods, systems, and products that analyzing time-varying annotations for related content.

SUMMARY

The problems noted above, along with other problems, may be reduced or eliminated by embodiments of the present invention using methods, systems, and products that analyze annotations for related content. Embodiments of the present invention organize annotations for not only organizational purposes but also for finding related content. The related content by be more annotations or the related content may be additional media, such as video, pictures, data, or any other content. The present invention examines annotations using spatial analysis, temporal analysis, pattern analysis, and other concepts to discover and to exploit contextual meaning.

According to aspects of the present invention, a method is disclosed for analyzing annotations for related content. A set of annotations, occurring within a window of time in a segment of content, is received. A query is sent for related content having a similar characteristic to the set of annotations. A recommendation is sent for the related content.

According to another aspect of the present invention, a system analyzes annotations for related content. A recommendation engine or application is stored in memory, and a processor communicates with the memory. The system receives a set of annotations occurring within a window of time in a segment of content. A query is sent for related content having a similar characteristic to the set of annotations. A recommendation is then sent for the related content.

In yet another aspect, a computer program product analyzes annotations for related content. The computer program product comprises a computer-readable medium storing computer-readable instructions. These instructions cause receipt of a set of annotations that occurs within a window of time in a segment of content. A query is sent for related content having a similar characteristic to the set of annotations. A recommendation is then sent for the related content Other aspects, including systems, methods, and/or computer program products according to the present invention will be or become apparent to one with ordinary skill in the art upon review of the following drawings and detailed description. Such additional aspects, including systems, methods, and/or computer program products, are included within the scope of the present invention.

BRIEF DESCRIPTION OF THE SEVERAL VIEWS OF THE DRAWINGS

The accompanying drawing figures incorporated in and forming a part of this specification illustrate several aspects, features, principles and advantages of the present invention, and together with the Detailed Description serve to better explain the aspects, features, principles, and advantages of the invention.

FIG. 3 is a schematic illustrating an exemplary concept for spatial relationships, according to even more aspects of the present invention.

FIG. 9 is a schematic illustrating patterns of annotations, according to additional aspects of the present invention.

FIG. 10 is another schematic illustrating patterns of annotations, according to more aspects of the present invention.

FIGS. 11 and 12 are flowcharts illustrating a method analyzing annotations for related content, according to aspects of the present invention.

DETAILED DESCRIPTION

The present invention now will be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will convey the invention to those skilled in the art.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
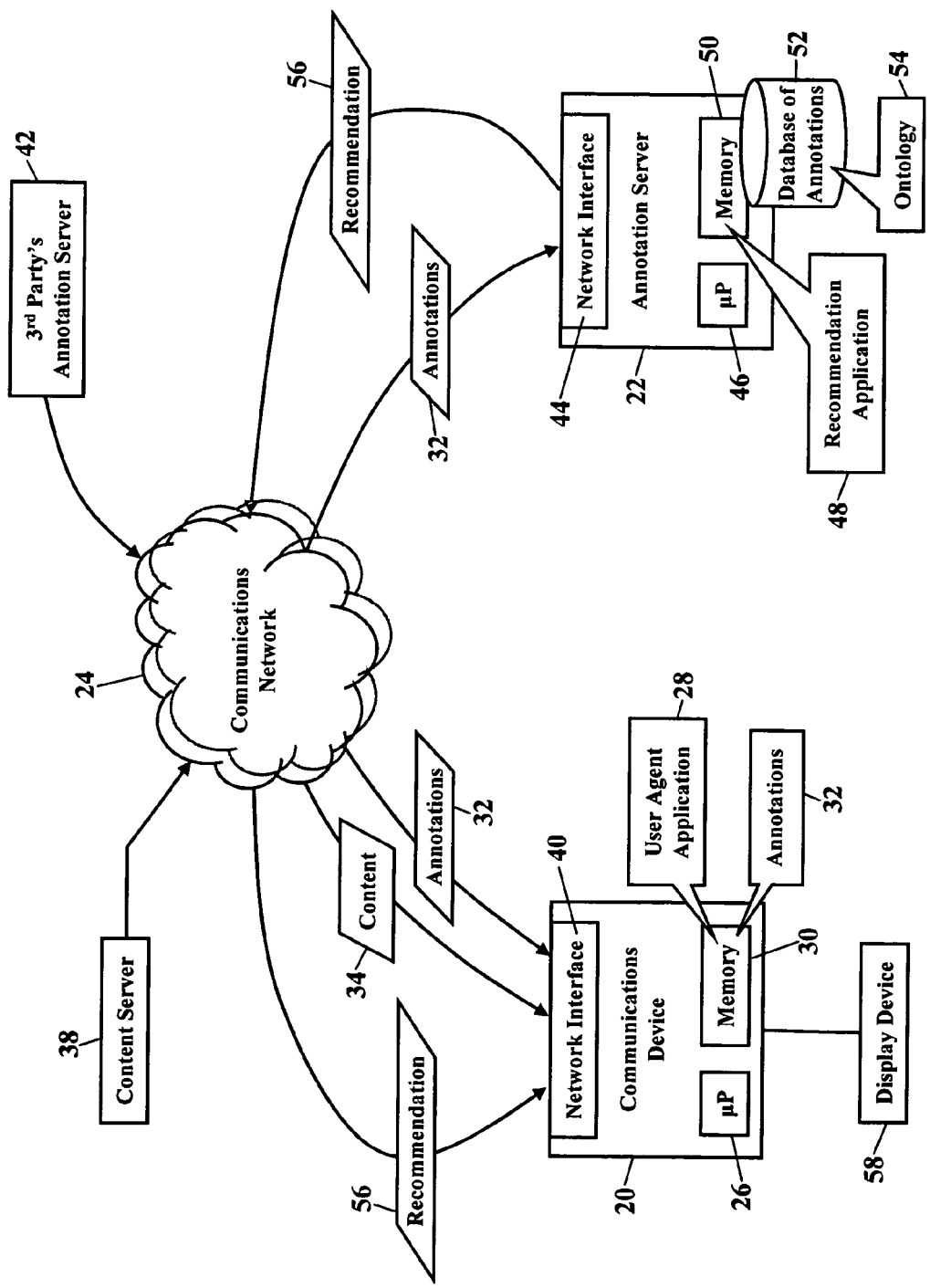
FIG. 1 is a schematic illustrating a network environment in which exemplary embodiments of the present invention may be implemented.

FIG. 1 is a schematic illustrating a network environment in which exemplary embodiments of the present invention may be implemented. A user's communications device 20 communicates with an annotation server 22 via a communications network 24. Although the user's communications device 20 is generically shown, the communications device 20, as will be later explained, may be any computer, analog/digital video recorder, set top box, personal digital assistant, cordless/cellular/IP phone, or any other processor-controlled device. Whatever the user's communications device 20, the user's communications device 20 has a processor 26 that executes a user agent application 28 stored in memory 30. The user agent application 26 is a software engine that obtains and analyzes annotations 32 associated with content 34. The term "content" includes any media, whether movies, pictures, images, music, text, links, programs, and data. The content 34 may be locally or remotely obtained. For simplicity, though, FIG. 1 illustrates the user's communications device 20 receiving the content 34 from a content server 38 via a network interface 40 to the communications network 24.

The annotations 32 describe or augment the content 34. The annotations 32 may be any media object, such as text, graphic(s), audio, and/or video, that describes the content 34. The annotations 32 may include tags, descriptors, definitions, metadata, commentary, notes, and/or links. The annotations 32 may or may not be associated with time offsets from a start or stop time in playable media. The annotations 32 may or may not be grouped, classified, or categorized, and such systems and methods are known in the art. The annotations 32 may be streamed with or within the content 34 from the content server 38. The annotations 32 may be locally stored and retrieved from the memory 30. The annotations 32 may be received or retrieved via the communications network 24 from a third party's server 42, such as an annotation service provider. ESPN®, for example, may be a third party provider of annotations 32 for sports programming. The annotations 32 may be fetched from any provider, such as a content provider, service provider, content producer, and/or channel producer. Some aspects of the annotations 32, however, are known, so this disclosure will not greatly explain the known details. If, however, the reader desires more details, the reader is invited to consult the following sources, all incorporated herein by reference in their entirety: U.S. Pat. No. 6,564,263 to Bergman et al. (May 13, 2003); Published U.S. Patent Application 2004/0010483 to Brands et al. (Jan. 15, 2004); Published U.S. Patent Application 2004/0054672 to Tsuchitani et al. (Mar. 18, 2004); Published U.S. Patent Application 2005/0034107 to Kendall et al. (Feb. 10, 2005); Published U.S. Patent Application 2005/0149510 to Shafrir (Jul. 7, 2005); Published U.S. Patent Application 2005/0216443 to Morton et al. (Sep. 29, 2005); U.S. patent application Ser. No. 11/388,849 filed Mar. 24, 2006 and entitled "Collaborative Media Player Control Annotations For Recorded Media Presentation"; and MPEG-7, ISO/IEC 15938-6:2003, available from the American National Standards Institute, 1819 L Street, NW, Washington D.C. 20036 USA.

However the annotations 32 are obtained, some or all of the annotations 32 are analyzed. The user's communications device 20 sends one, some, or all of the annotations 32 to the annotation server 22. The annotation server 22 receives the annotations 32 via a network interface 44 to the communications network 24. The annotation server 22 includes a processor 46 or application specific integrated circuit (ASIC) that executes a recommendation application 48 stored in memory 50. The recommendation application 48 is a software engine that analyzes the annotations 32 and recommends related content. That is, the recommendation application 48 recommends other, related content that shares some common or similar characteristic with the annotations 32. When the annotation server 22 receives the annotations 32, the recommendation application 48 queries a database 52 of annotations.

The database 52 of annotations stores data that describes annotations for any type of content. The database 52 of annotations, for example, may store sequential annotations for movies, programs, and other content. The database 52 of annotations may additionally or alternatively store samples of annotations that are associated with content. The database 52 of annotations may additionally or alternatively store an ontology 54 that semantically describes annotations. The ontology 54 may describe nodal relationships between classifications of annotations. Whatever data or information the database 52 of annotations contains, as the following paragraphs explain, the recommendation application 48 queries the database 52 for other content having similar relationships between annotations. The database 52 of annotations responds with the query results and providers those query results to the recommendation application 48. Those of ordinary skill in the art understand that the database 52 of annotations may be locally stored in the memory 50 of the annotation server 22, or the database 50 may be remotely accessed via the communications network 24 or via a local network (not shown for simplicity).

A recommendation message 56 is sent. The recommendation application 48 instructs the processor 46 to send the recommendation message 56 to the user's communications device 20. The recommendation message 56 may include the query results that describe related content that shares some common or similar characteristic with the annotations 32. When the user's communications device 20 receives the recommendation message 56, the user's communications device 20 causes the recommendation message 56 to be visually or audibly presented on a display device 58. The recommendation message 56 may additionally or alternatively be stored in the memory 30 for later viewing or processing. The recommendation message 56 thus recommends the related content to the user.

The recommendation application 48 suggests related content. The related content may be suggest before, during, or after the user receives the content 34. As the user receives, watches, listens to, or otherwise experiences the content 34, the user agent application 28 and the recommendation application 48 cooperate to provide more meaning to the annotations 32. The present invention thus augments the user's experience with additional, related content. The recommendation application 48, for example, may identify any positional, spatial, temporal, and/or semantic relationship that exists between the annotations 32 and the information stored in the database 52 of annotations. The recommendation application 48 may thus generate additional annotations, or use the discovered relationship(s), to generate other content recommendations.

Figure 2:
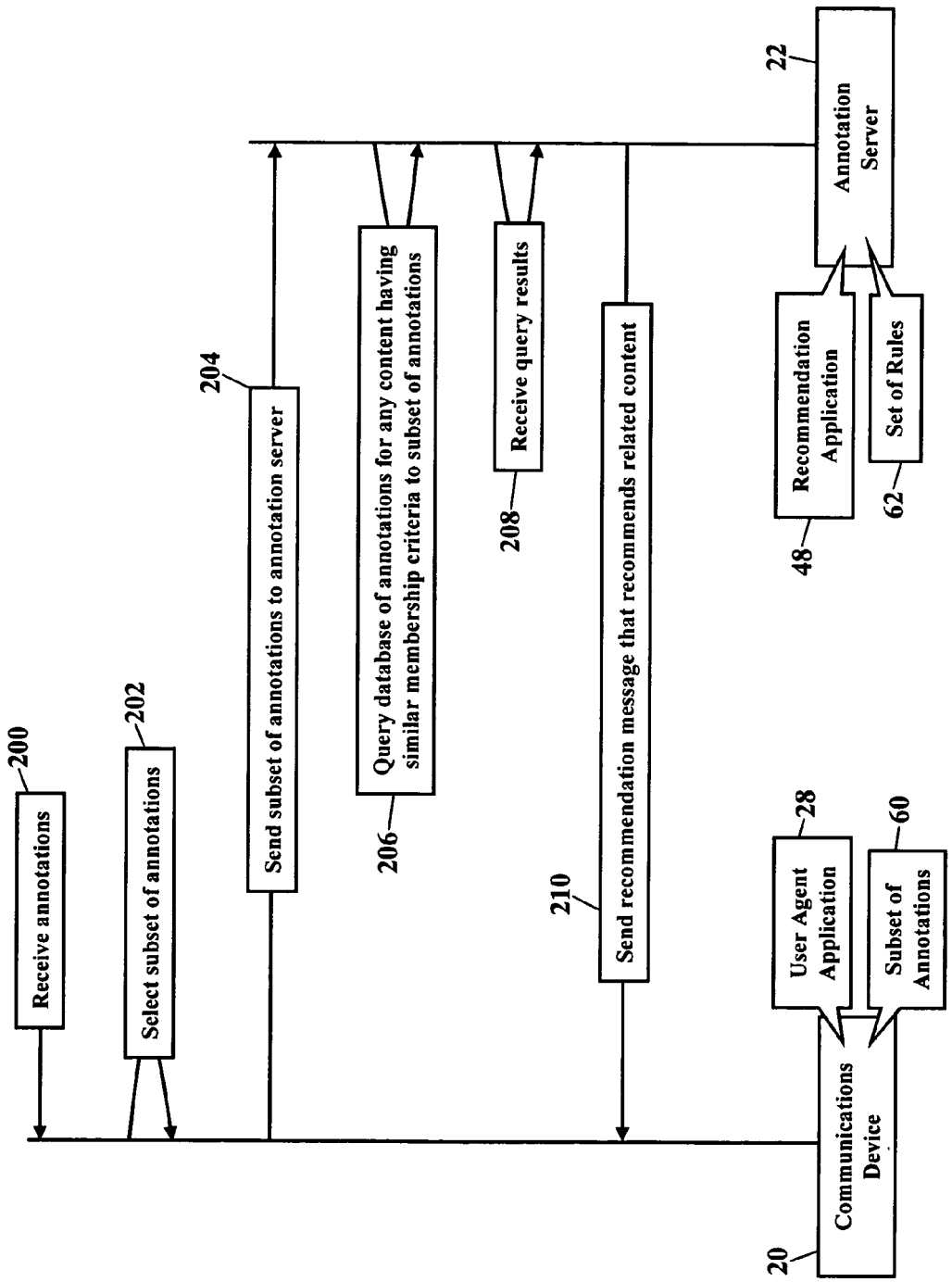
FIG. 2 is a schematic illustrating a process of analyzing annotations for related content, according to more aspects of the present invention.

FIG. 2 is a schematic illustrating a process of analyzing annotations for related content, according to more aspects of the present invention. Here again the user's communications device 20 receives the annotations (Step 200). The user agent application 28 selects a subset 60 of annotations from within the annotations (Step 202) and communicates the subset 60 to the annotation server 22 (Step 204). The user agent application 28 may select any sequence or combination of annotations that occur within the content (shown as reference numeral 34 in FIG. 1). The user agent application 28, for example, may select sequential annotations occurring within a certain period of time within a segment of the content. Suppose, for example, the subset 60 of annotations contains (A, B, C, D, E) that occur within a twenty five (25) second window of time. The recommendation application 48 may then query the database of annotations (shown as reference numeral 52 in FIG. 1) for any content having the one, some, or all of those same annotations (Step 206). The recommendation application 48, for example, may query for any content having any sequential pairing of the same annotations (e.g., (A, B), (C, D) or (D, E)). The recommendation application 48 may additionally or alternatively query for any content having any matching sequence of annotations (e.g., (A, B), (A, B, C), or (B, C, D, E)). The recommendation application 48 may query for any content having adjacent pairs of the same annotations, such as ((A, B) or (B, A)) or ((B, C) or (C, B)). The recommendation application 48 may leniently query for any related content simply having membership in the subset 60 of annotations (e.g., any annotation (A, B, C, D, E)). The recommendation application 48, however, may query for more stringent requirements, such as any membership criteria within the same window of time (e.g., 25 seconds). The recommendation application 48, in short, may query for any membership subset. The user and/or the service provider may even configure a set 62 of rules that define the query criteria. The set 62 of rules may impose lenient, moderate, or stringent requirements on the query results. Whatever the query requirements, the annotation server 22 receives the query results (Step 208) and returns the recommendation message (Step 210). The recommendation message 56 recommends the related content to the user.

The user's communications device 20 and the annotation server 22 are only simply illustrated. Because the architecture and operating principles of computers, communications devise, and other processor-controlled devices are well known, the hardware and software componentry of the user's communications device 20 and the annotation server 22 are not further shown and described. If, however, the reader desires more details, the reader is invited to consult the following sources, all incorporated herein by reference in their entirety: WILLIAM STALLINGS, COMPUTER ORGANIZATION AND ARCHITECTURE: DESIGNING FOR PERFORMANCE (7th Ed., 2005); and DAVID A. PATTERSON & JOHN L. HENNESSY, COMPUTER ORGANIZATION AND DESIGN: THE HARDWARE/SOFTWARE INTERFACE ($3^{rd}$. Edition 2004).

FIG. 3 is a schematic illustrating an exemplary concept for spatial relationships, according to even more aspects of the present invention. FIG. 3 illustrates sequential timelines of annotations occurring in time within two segments of different content (e.g., THE WRATH OF KAHN® and episode number five of TJ HOOKER®). Here spatial relationships, such as proximity between annotations, may be used to determine that at least two annotations are related. As FIG. 3 illustrates, suppose annotation "A" (Captain Kirk) is related to annotation "E" (TJ Hooker). The "A" and "E" annotations, therefore, have already been classified, as in known in the art. Here a proximity analysis may be used to discover relationships between semantic concepts. Ordinarily these semantic relationships may be hard to discern. The present invention, however, may use spatial analysis to discover richer relationships between annotations and between content. Those who are familiar with STAR TREK® may realize that Kirk and Leonard Nemoy are related. While such a relationship may be obvious to fans of this popular TV show, the ontology (shown as reference numeral 54 in FIG. 1) may map much more complex associations. Yet this relationship could be discovered from the proximal and/or temporal relationships that exist between annotations in THE WRATH OF KAHN®. Proximity and/or time may thus be used to understand relationships among these annotations. Here, then, because annotations "A" and "E" cross a timeline and proximately appear near a middle time, a relationship may be discovered between "A" (Captain Kirk) and "E" (TJ Hooker). So whenever the user experiences content associated with the annotation "A," the exemplary concept may invoke the relationship between "A" and "E" to suggest or recommend some content and/or annotation(s) related to TJ HOOKER®. This simple exemplary concept, then, actively discovers these relationships that may not have been known prior to examining annotations and their spatial and/or temporal relationship with one another.

Figure 4:
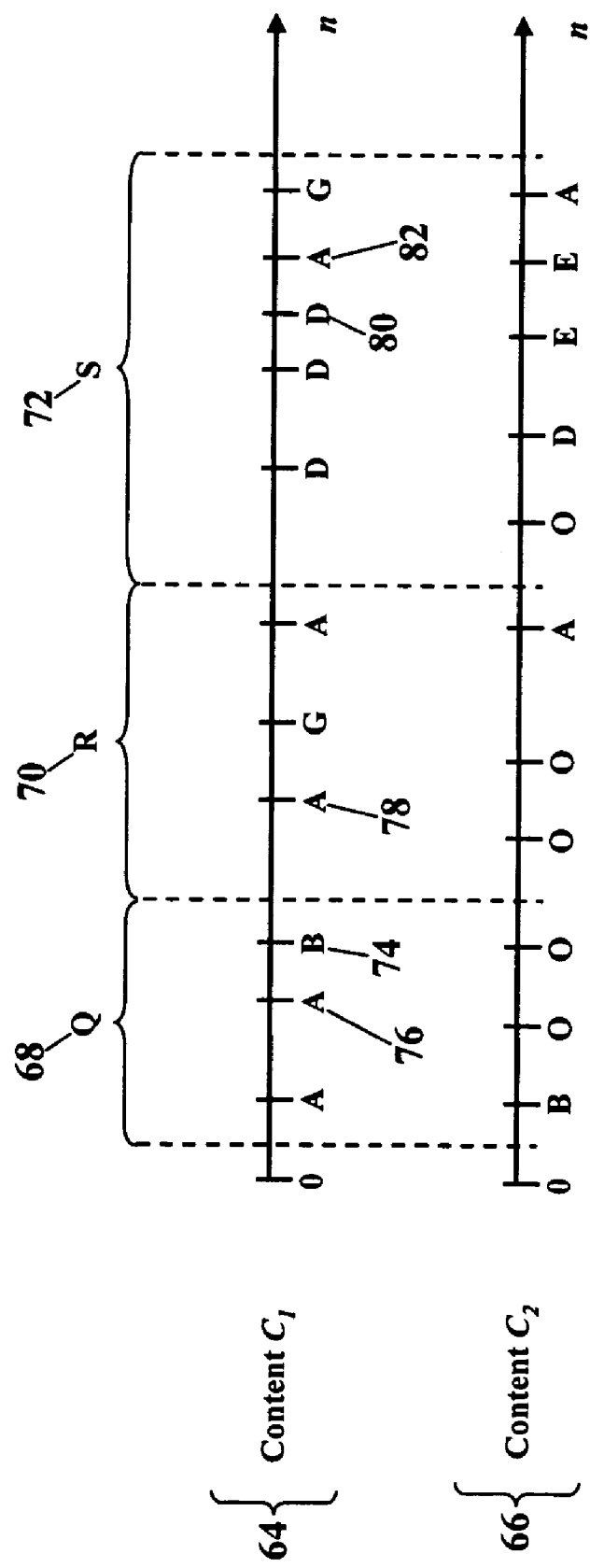
FIG. 4 is a schematic illustrating temporal relationships, according to still more aspects of the present invention.

FIG. 4 is a schematic illustrating temporal relationships, according to still more aspects of the present invention. FIG. 4 illustrates sequential timelines of annotations occurring over time within two segments of different content. A first content segment $C_1$ and a second content segment $C_2$ (shown, respectively, as reference numerals 64 and 66) each have annotations at different time segments. These annotations are labeled as A, B, G, D, O and E. Although each piece of content has annotations labeled with the same letters, the annotations need not be identical. If an annotation classification system is used, the content segments $C_1$ and $C_2$ may merely have similarly classified annotations. FIG. 4 also illustrates three (3) time segments Q, R, and S (shown, respectively, as reference numerals 68, 70, and 72).

FIG. 4 illustrates that relationships by time may be discovered. By examining the annotations over time in the first content segment $C_1$, the recommendation application (shown as reference numeral 48 in FIGS. 1 & 2) may determine, based on spatial position, that the following annotations are related: (A, B), (A, G), and (A, D). The recommendation application may select any one, two, or more annotations that have a temporal relationship, and the recommendation application queries for related content having a matching or similar temporal relationship. The recommendation application may query for temporal relationships across similar or dissimilar content.

Relationships may also have strength. The recommendation application may measure the strength or weight of any relationship between annotations. Just knowing a relationship exists between two or more annotations may not permit manipulations. When all relationships are equal, meaningful comparisons may not be possible. The recommendation application, however, may measure strength based on spatial and/or temporal proximity between at least two annotations. FIG. 4 illustrates, for example, an annotation "B" (shown as reference numeral 74) flanked by two "A" annotations (shown as reference numerals 76 and 78). FIG. 4 also illustrates a proximal relationship between a "D" annotation and another "A" annotation (shown, respectively, as reference numerals 80 and 82). Because the annotation "B" is flanked by the two "A" annotations, the recommendation application may infer or indicate that the (A, B) relationship is stronger than the (A, D) relationship.

Strength may be measured by time. Annotations that occur close in time, for example, may be stronger than annotations spaced farther apart. Annotations typically occur in units of time, measured from a start (or as an offset) from a beginning of the content or segment of content. Again referring to FIG. 4, in the first content segment $C_1$, the (A, B) relationship may be stronger than the (B, D) relationship, due to temporal distances. Transitivity may also be used to further express relations between pairs of annotations. If the pair of annotations (B, G) is related, and if the pair of annotations (B, D) is related, then transitivity logically determines that annotations (G, D) are related. Because these are transitive relationships, however, the recommendation application may not consider such transitive relationships as strong.

Figure 5:
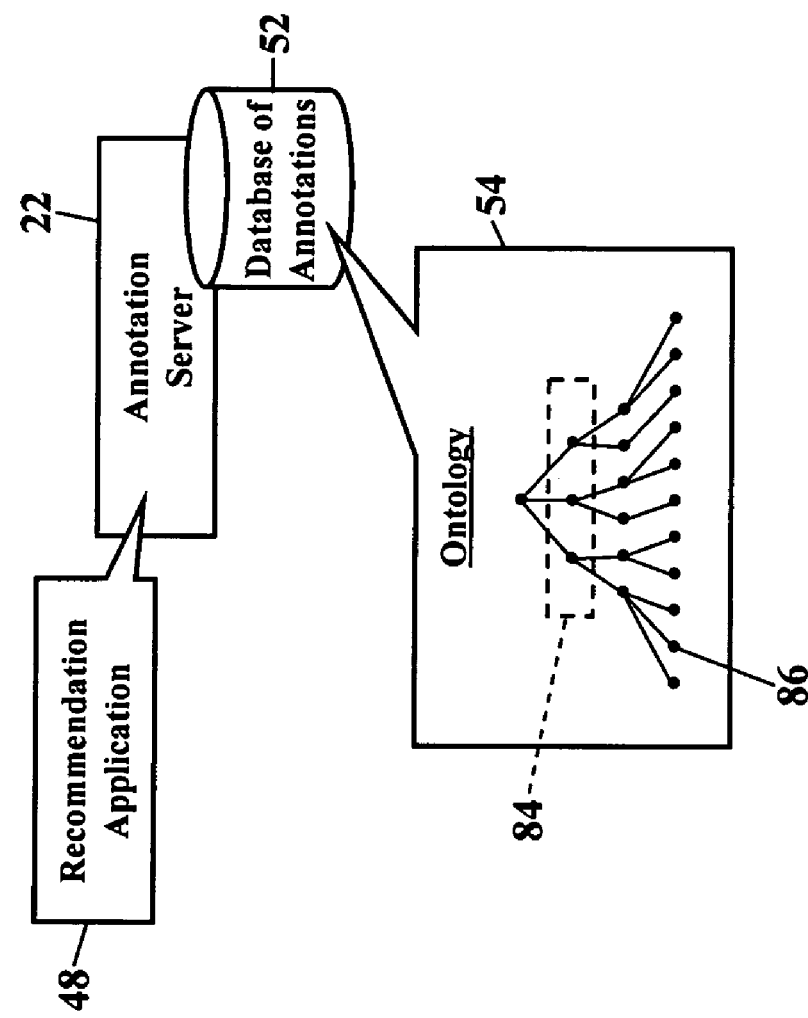
FIG. 5 is a schematic illustrating semantic strength, according to additional aspects of the present invention.

FIG. 5 is a schematic illustrating semantic strength, according to additional aspects of the present invention. Here the strength of a relationship is measured by semantic distance in the ontology 54. When the annotation server 22 receives annotations, the recommendation application 48 may query the database 52 of annotations, and the ontology 54, for semantic distance between annotations. As those of ordinary skill in the art understand, the ontology 54 may include hierarchical levels 84 or tiers and nodes 86. Each hierarchical level 84 and each node 86 may represent categories or classifications for annotations. The distance, or "hops," between nodes or levels within the ontology 54 may be used to measure and/or express the strength of relationships. Annotations that are one or two nodes apart, for example, may have a stronger relationship than annotations several nodes, or several levels, apart. Because ontologies are well known to those of ordinary skill in the art, however, this specification will not greatly describe the known aspects of the ontology 54. If, however, the reader desires more information, the reader is invited to consult the following sources, all of which are incorporated herein by reference in their entirety: W3C Recommendation, OWL Web Ontology Language—Overview, available from W3C, 32 Vassar Street, Room 32-G515, Cambridge, Mass. 02139 USA; U.S. Pat. No. 6,311,194 to Sheth et al. (Oct. 3, 2001); U.S. Pat. No. 6,498,795 to Zhang et al. (Dec. 24, 2002); U.S. Pat. No. 6,772,160 to Cho et al. (Aug. 3, 2004); Published U.S. Patent Application 2003/0120662 to Vishik (Jun. 26, 2003); Published U.S. Patent Application 2004/0220893 to Spivack et al. (Nov. 4, 2004); Published U.S. Patent Application 2005/0034107 to Kendall et al. (Feb. 10, 2005); and Published U.S. Patent Application 2005/0154701 to Parunak et al. (Jul. 14, 2005).

Measurements of strength may be numerically expressed. When the recommendation application 48 queries the database 52 of annotations and/or the ontology 54, the query results may include a numerical expression of strength. The recommendation application 48 may alternatively or additionally calculate, assign, or indicate the strength of any relationship. The notation (B, G, 45), for example, may indicate that annotations "B" and "G" occur within forty five (45) seconds. Another notational format could additionally identify the associated content. The notation (B, G, 1, 45), for example, could be used to indicate 45 seconds between annotations "B" and "G" in content "1." These notations may be used to describe multiple instances of a relationship between annotations "B" and "G" in multiple pieces of content with different strengths. Strength, however, may also indicate semantic relationship. The distance, or "hops," between nodes or levels within the ontology 54 may be used to measure and/or express the strength of relationships. The strength of a relationship between nodes may be measured by the semantic distance, or nodal distance, in the ontology 54.

Figure 6:
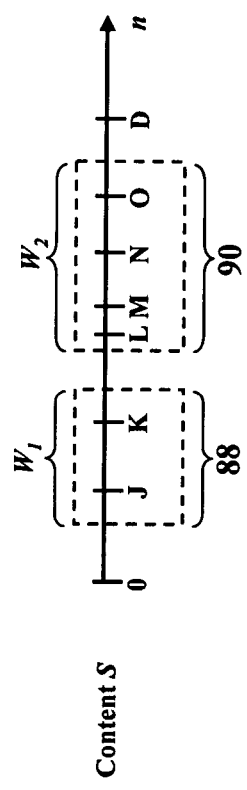
FIG. 6 is a schematic illustrating additional relationships in time, according to more aspects of the present invention.

FIG. 6 is a schematic illustrating additional relationships in time, according to more aspects of the present invention. Here one or more sliding windows of time may be used to discover relationships between annotations in different content. FIG. 6 illustrates a timeline of annotations (J, K, L, M, N, O, D) occurring over time within a segment S of content. FIG. 6 also illustrates a first window $W_1$ of time and a second window $W_2$ of time (shown, respectively, as reference numerals 88 and 90). The smaller the window of time, then the stronger the relationships between annotations. As the window of time grows, however, relationships between annotations tend to weaken. Suppose, for example, that the first window $W_1$ of time has captured two annotations (e.g., "J" and "K"). Because both annotations occur within the first window $W_1$ of time, a relationship may be defined between those two annotations. The second window $W_2$ of time has captured three annotations "L," "N," and "O." The recommendation application (shown as reference numeral 48 in FIGS. 1, 2, & 5) may determine the following relationships from the second window $W_2$ of time: (L, N), (L, O), and (O, N). Because the second window $W_2$ of time is smaller than the first window $W_1$ of time, these relationships may be stronger and more semantically meaningful. Note also that the sliding windows $W_1$ and $W_2$ may detect new relationships as each window moves or "slides" along the content over time.

Figure 7:
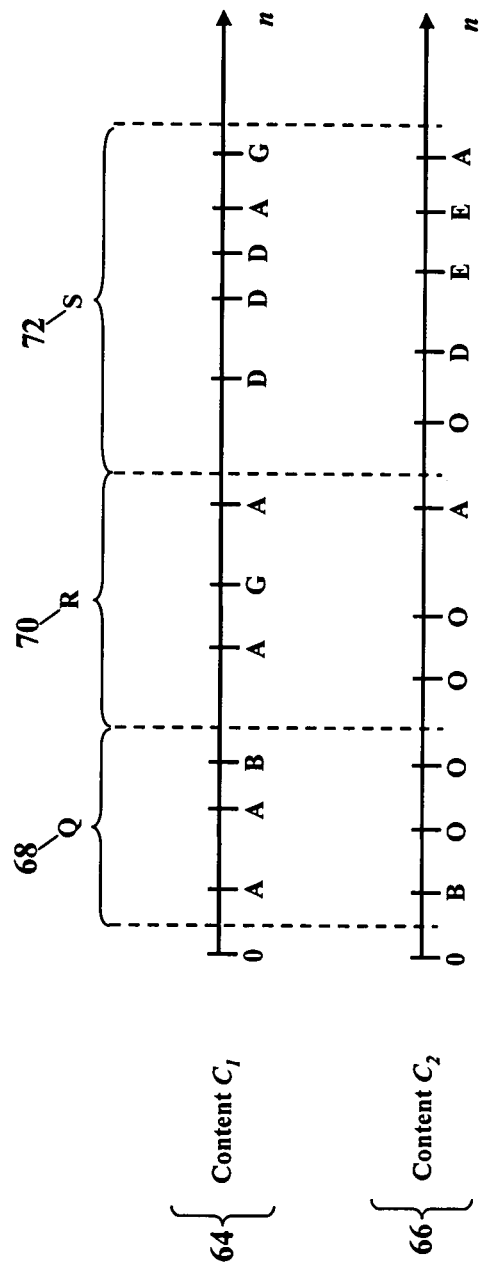
FIG. 7 is a schematic illustrating segmental relationships, according to even more aspects of the present invention.

FIG. 7 is a schematic illustrating segmental relationships, according to even more aspects of the present invention. Here the recommendation application (shown as reference numeral 48 in FIGS. 1, 2, & 5) may discover or establish semantic relationships when annotations occur in the same segment of time (or window of time) across different pieces or segments of content. These relationships are considered semantically stronger if the different pieces of content are related. FIG. 7, for example, again illustrates sequential timelines of annotations occurring within the first content segment $C_1$ and the second content segment $C_2$ (shown, respectively, as reference numerals 64 and 66). FIG. 7 also illustrates the three time segments Q, R, and S (shown, respectively, as reference numerals 68, 70, and 72). When time segment S is inspected or analyzed, the recommendation application may observe the annotations across both segments of content and establish the following additional relationships:

(D, O),
(D, E),
(A, O),
(A, E),
(G, O),
(G, D), and
(G, E).

Figure 8:
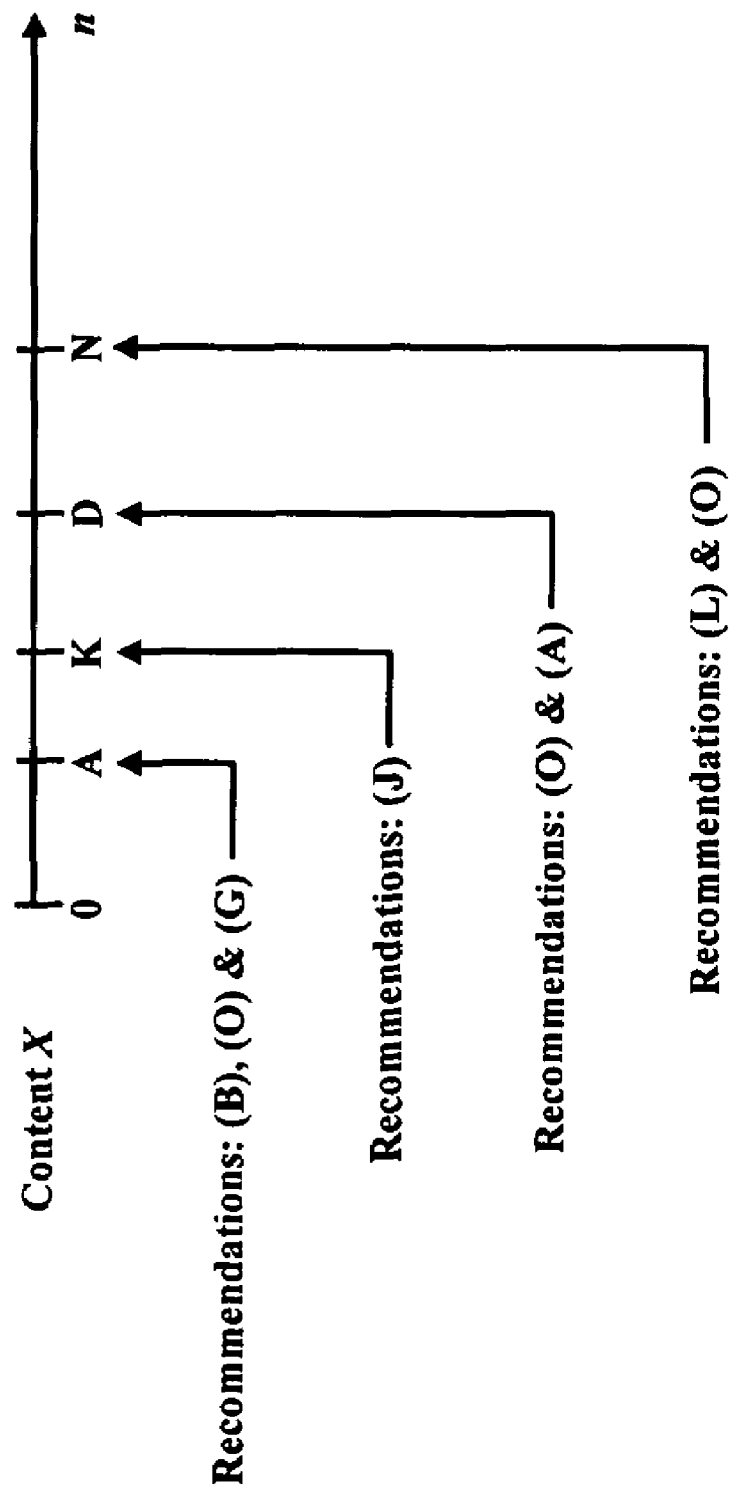
FIG. 8 is a schematic illustrating additional semantic relationships, according to still more aspects of the present invention.

FIG. 8 is a schematic illustrating additional semantic relationships, according to still more aspects of the present invention. Here the recommendation application (shown as reference numeral 48 in FIGS. 1, 2, & 5) exploits semantic knowledge to recommend additional annotations and/or content to the user. Using any of the exemplary concepts described herein, the recommendation application may recommend additional annotations based on relationships between annotations. FIG. 8, for example, illustrates a timeline of annotations (A, K, D, N) occurring over time within the segment X of content. For each of the annotations in X, the recommendation application may recommend additional, related annotations that may interest the user.

Annotation "A," for example, may have related annotations. The recommendation application may recommend annotation "B" based on a temporal relationship as shown and discussed with reference to the first content segment Q (shown as reference numeral 68) in FIG. 4. The recommendation application may recommend annotation "O" based on the time segments Q shown in FIG. 7. The recommendation application may also recommend annotation "G" based on another temporal relationship in the second content segment R (shown as reference numeral 70) in FIG. 4.

FIG. 8 illustrates that still more annotations may be recommended. Because the first sliding window $W_1$ of time (as illustrated in FIG. 6) may associate annotations "J" and "K," the recommendation application may recommend annotation "J." The recommendation application may also recommend annotation "O" based on a time relationship between "D" and "O" discovered in the third content segment S (shown as reference numeral 72 in FIG. 4). Because the segment X of content contains annotation "N," the recommendation application may recommend annotation "O" due to the time segment relationship discovered within the second window $W_2$ of time (shown as reference numeral 90 in FIG. 6). The recommendation application may also recommend annotation "A" based on a time segment relationship between "A" and "D" discovered in the third time segment S (shown as reference numeral 72 in FIG. 7). Because the segment X of content contains annotation "N," the recommendation application may recommend annotation "L" based on relationships discovered from the second window $W_2$ of time (shown as reference numeral 90 in FIG. 6).

Annotations may be ranked and/or weighted. The recommendation application may be configured to weight certain annotations, segments, windows of time, semantics, and/or relationships. The user, for example, may assign weighting factors, such that those portions with larger weights have greater influence. Rankings may also be used to determine what relationships are preferred. The user, for example, may feel that the sliding windows W of time (as illustrated in FIG. 6) produced better results, so that analysis technique is first ranked in preference. The technique producing the least favorable results may be last ranked.

FIG. 9 is a schematic illustrating patterns of annotations, according to additional aspects of the present invention. FIG. 9 again illustrates sequential timelines of annotations for a first content segment $K_1$ and a different, second content segment $K_2$ (shown, respectively, as reference numerals 92 and 94). Here the recommendation application (shown as reference numeral 48 in FIGS. 1, 2 & 5) queries for related content having a matching or similar pattern of annotations. The recommendation application may infer content characteristics by examining patterns of annotations. Content with similar patterns of annotation may be similar or even closely related. Patterns may be discovered, even between dissimilar pieces of content. If two pieces or segments of content have a similar pattern of annotations, they may be related, even though the annotations themselves are different. As the recommendation application discovers and/or compares patterns of annotations, the recommendation application may compare those patterns to one or more thresholds. The thresholds may establish minimum requirements when comparing patterns of annotations. If the threshold(s) is/are satisfied, then the recommendation application may recommend related content. The recommendation application may additionally or alternatively develop a "compatibility score" for evaluating how closely two patterns of annotations match. A high compatibility score, for example, may indicate a high correlation between the patterns of annotations.

The recommendation application searches or queries for patterns. The first content segment $K_1$, for example, has a pattern 96 of annotations (illustrated as "C, A, C, A"). Note that there may zero or more annotations between the patterns, but the recommendation application has detected this pattern using standard algorithms known in the art. The recommendation application may also rank the strength of the pattern depending on the spatial and/or temporal proximity of the annotations. The recommendation application then queries for other content with a similar pattern of annotations. Suppose, for example, the query results in the second content segment $K_2$ (shown as reference numeral 94). This second content segment $K_2$ has the same pattern of annotations ("C, A, C, A" shown as reference numeral 98) and may include its own strength based on the proximity of the pattern annotations.

FIG. 10 is another schematic illustrating patterns of annotations, according to more aspects of the present invention. FIG. 10 again illustrates sequential timelines of annotations for a first content segment $P_1$ and a different, second content segment $P_2$ (shown, respectively, as reference numerals 100 and 102). Here the recommendation application (shown as reference numeral 48 in FIGS. 1, 2 & 5) queries for related content having a matching or similar subsets of annotation relationships. The first content segment $P_1$, for example, has subsets (B, A), (B, D), (E, B), and (Q, R). The recommendation application then queries for other content with a similar subsets of annotation relationships. The query results in the second content segment $P_2$ (shown as reference numeral 102) having (Q, R), (E, B), (D, B), and (A, B). Notice, however, that the first content segment $P_1$ contains (B, A), while the second content segment $P_2$ contains (A, B). The first content segment $P_1$ also contains (B, D) while the second content segment $P_2$ contains (D, B). Although the pairs are not chronologically matching, the mere presence of these pairs means the two segments $P_1$ and $P_2$ of content may have similar material.

Patterns may include more than pairings. FIG. 10 also illustrates that the first content segment $P_1$ may be analyzed as having the larger set of annotations (B, A, B, D) (shown as reference numeral 104). When the recommendation application queries for related content, the query results may reveal that the second content segment $P_2$ has (D, B, A, B) (shown as reference numeral 106). Again, although the annotations are not an exact pattern match, the two pieces of content have matching membership and, perhaps, similar material. FIG. 10 thus illustrates that even though annotations may have different offsets from the start of the content, their spatial and/or temporal relationships may indicate an as yet undiscovered relationship. Content that has matching or similar annotation relationships (whether based on time or sliding window relationships, as discussed above) may also be closely related. Such relationships, in fact, may have a higher likelihood of being related than comparing simple annotation patterns.

FIGS. 11 and 12 are flowcharts illustrating a method analyzing annotations for related content, according to aspects of the present invention. A set of annotations is received that occur within a window of time in a segment of content (Block 300). A query may be sent for any related content having a membership subset of the set of annotations (Block 302). A query may be sent for related content having a matching sequence of annotations for the membership subset (Block 304). A query may be sent for related content having a matching semantic relationship to the membership subset (Block 306). A query may be sent for related content having a matching pattern of annotations to the membership subset (Block 308). At least two annotations having a spatial relationship are selected and query may be issued for related content having the same spatial relationship (Block 310). At least two annotations having a temporal relationship are selected and query is issued for related content having the same temporal relationship (Block 312).

The flowchart continues with FIG. 12. A query may be sent for a strength of the temporal relationship based on proximity between the at least two annotations (Block 314) or semantic distance in an ontology (Block 316). The query result(s) is/are received (Block 318) and a recommendation is sent that recommends the related content (Block 320).

Figure 13:
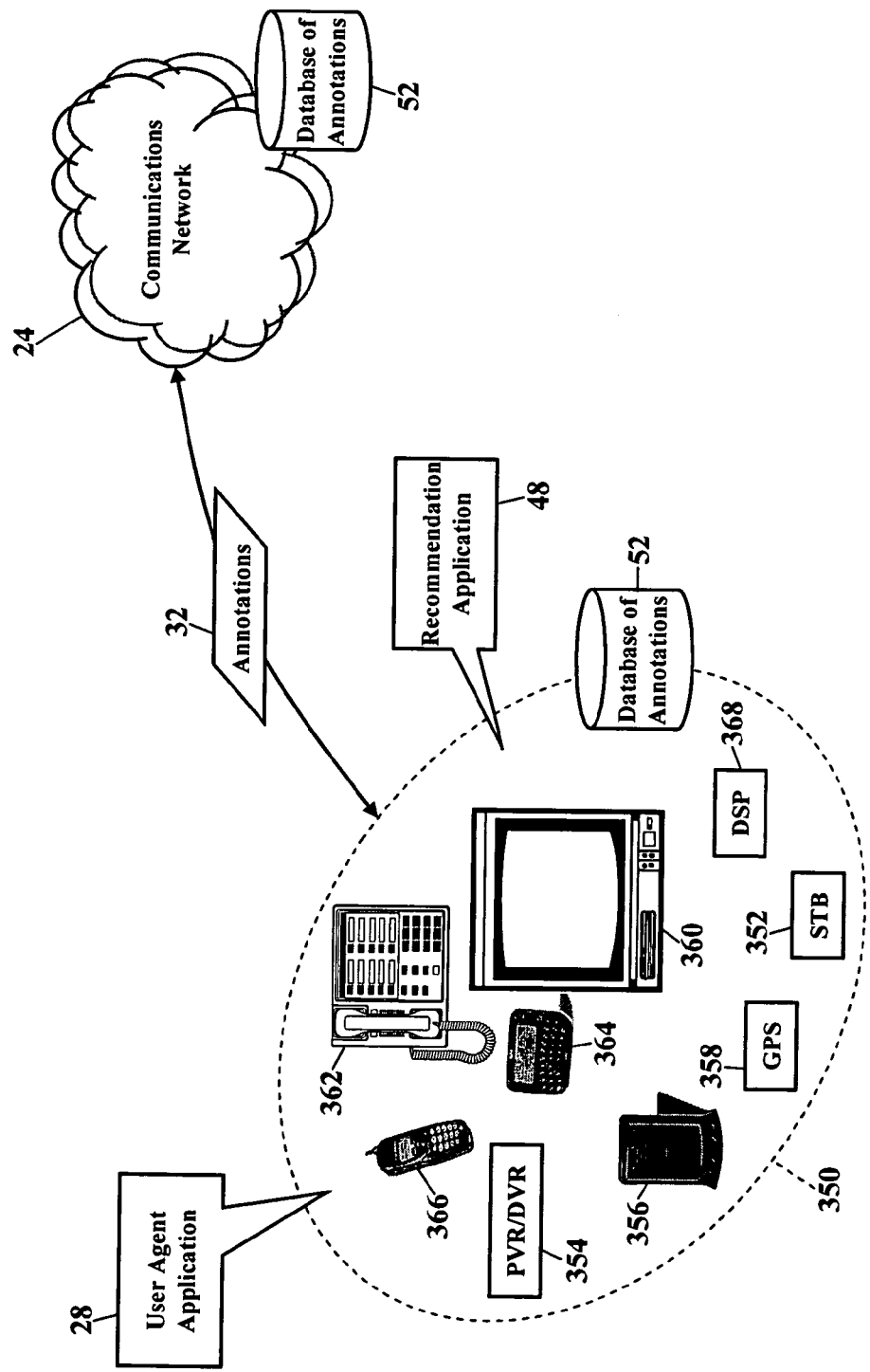
FIG. 13 depicts other possible operating environments for additional aspects of the present invention.

FIG. 13 depicts other possible operating environments for additional aspects of the present invention. FIG. 13 illustrates that the user agent application 28 and/or the recommendation application 48 may alternatively or additionally operate within various other communications devices 350. FIG. 13, for example, illustrates that the user agent application 28 and/or the recommendation application 48 may entirely or partially operate within a set-top box (352), a personal/digital video recorder (PVR/DVR) 354, personal digital assistant (PDA) 356, a Global Positioning System (GPS) device 358, an interactive television 360, an Internet Protocol (IP) phone 362, a pager 364, a cellular/satellite phone 366, or any computer system and/or communications device utilizing a digital signal processor (DSP) 368. The communications device 350 may also include watches, radios, vehicle electronics, clocks, printers, gateways, and other apparatuses and systems. Because the architecture and operating principles of the various communications devices 350 are well known, the hardware and software componentry of the various communications devices 350 are not further shown and described. If, however, the reader desires more details, the reader is invited to consult the following sources, all incorporated herein by reference in their entirety: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known Subscriber Identity Modules, Functional Characteristics (GSM 02.17 V3.2.0 (1995-01))"; the GSM Standard 11.11, formally known as Specification of the Subscriber Identity Module—Mobile Equipment (Subscriber Identity Module—ME) interface (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, iTV HANDBOOK: TECHNOLOGIES AND STANDARDS (2004).

As FIG. 13 suggests, the recommendation application 48 may be locally stored at the user's communications device (shown as reference numeral 20 in FIG. 1). When the user's communications device receives the annotations 32, the recommendation application 48 may locally analyze the annotations 32 and recommend related content. The database 52 of annotations may also be locally stored in the user's communications device, or the database 52 of annotations may be remotely accessed via the communications network 24. Whatever the network configuration, the recommendation application 48 still recommends other, related content that shares some common or similar characteristic with the annotations 32.

The user agent application and/or the recommendation application may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000). This computer-readable medium, or media, could be distributed to end-users, licensees, and assignees. These types of computer-readable media, and other tangible types not mentioned here but considered within the scope of the exemplary embodiments, allow the present invention to be easily disseminated. A computer program product comprises the user agent application and/or the recommendation application stored on the computer-readable medium. The user agent application and/or the recommendation application comprises computer-readable instructions/code for analyzing annotations, as hereinabove explained. The user agent application and/or the recommendation application may also be physically embodied on or in any addressable (e.g., HTTP, I.E.E.E. 802.11, Wireless Application Protocol (WAP), or BLUETOOTH®) wireless device capable of presenting an IP address.

While the present invention has been described with respect to various aspects, features, principles, and exemplary embodiments, those skilled and unskilled in the art will recognize the present invention is not so limited. Other aspects, variations, modifications, and alternative embodiments may be made without departing from the spirit and scope of the present invention and are considered within the scope of the concepts disclosed herein and the invention as described by the claims.

What is claimed is:

1. A system, comprising:
a recommendation application stored in memory; and
a processor communicating with the memory and with the recommendation application,
the system receiving a set of annotations that occurs within a window of time in a segment of content, the system selecting a membership subset having an annotation from the set of annotations, the system querying for related content having the membership subset of the set of annotations, and the system sending a recommendation that recommends the related content, wherein the processor selects at least two annotations from the set of annotations that have a spatial relationship and a temporal relationship, wherein the spatial relationship relates to a proximity between the at least two annotations which may be used to determine a relationship between the at least two annotations and the processor queries for related content having the same spatial relationship and the same temporal relationship.

2. The system according to claim 1, wherein the processor queries for a strength of the temporal relationship, the strength based on at least one of:
 i) proximity between the at least two annotations; and
 ii) semantic distance in an ontology.

3. The system according to claim 1, wherein the processor queries for related content having a matching sequence of annotations for the membership subset.

4. The system according to claim 1, wherein the processor queries for related content having a matching semantic relationship to the membership subset.

5. The system according to claim 1, wherein the processor queries for related content having a matching pattern of annotations to the membership subset.

* * * * *